United States Patent [19]

Martin

[11] 4,031,351
[45] June 21, 1977

[54] HIGH ENERGY LASER BEAM CUTTING METHOD AND APPARATUS

[75] Inventor: Jean Martin, Chatillon, France

[73] Assignee: Groupement Atomique Alsacienne Atlantique, Le Plessis-Robinson, France

[22] Filed: July 28, 1975

[21] Appl. No.: 599,437

Related U.S. Application Data

[63] Continuation of Ser. No. 408,910, Oct. 23, 1973, abandoned.

[30] Foreign Application Priority Data

Oct. 25, 1972    France ............................ 72.37880

[52] U.S. Cl. ........................................... 219/121 L
[51] Int. Cl.² ......................................... B23K 26/00
[58] Field of Search ... 219/121 L, 121 LM, 121 EB, 219/121 EM, 121 P, 68, 70, 72; 331/94.5 R, 94.5 T, 94.5 G

[56] References Cited
UNITED STATES PATENTS

| | | | |
|---|---|---|---|
| 3,075,065 | 1/1963 | Ducati et al. | 219/121 P X |
| 3,077,108 | 2/1963 | Gage et al. | 219/121 P X |
| 3,383,491 | 5/1968 | Muncheryan | 219/121 L |
| 3,392,259 | 7/1968 | Meier | 219/121 L |
| 3,519,334 | 7/1970 | Heitmann et al. | 219/121 L X |
| 3,524,046 | 8/1970 | Brouwer | 219/121 L X |
| 3,569,660 | 3/1971 | Houldcroft | 219/121 L |
| 3,594,261 | 7/1971 | Broerman | 219/121 L X |
| 3,600,065 | 8/1971 | Law et al. | 219/121 L X |
| 3,601,576 | 8/1971 | Schiafli et al. | 219/121 L |
| 3,604,890 | 9/1971 | Mullaney et al. | 219/121 L |
| 3,622,743 | 11/1971 | Muncheryan | 219/121 L |
| 3,671,883 | 6/1972 | Smars | 331/94.5 R |
| 3,685,882 | 8/1972 | Van Der Jagt | 219/121 LM X |

*Primary Examiner*—Bruce A. Reynolds
*Assistant Examiner*—Clifford C. Shaw
*Attorney, Agent, or Firm*—Sughrue, Rothwell, Mion, Zinn & Macpeak

[57] ABSTRACT

Method and device enabling the injecting in the cutting groove of a gas coming from a nozzle at a supersonic speed, brought to a temperature which may probably be very high. A device for injecting an auxiliary gas ensures the protection of the front lens of the laser. Increase in the cutting speed.

4 Claims, 3 Drawing Figures

HIGH ENERGY LASER BEAM CUTTING METHOD AND APPARATUS

This application is a continuation application of Ser. No. 408,910 filed on Oct. 23, 1973, identically entitled, now abandoned.

BACKGROUND OF THE INVENTION

1. Field of the Invention

The present invention concerns a method and a device improving the cutting of material by an laser beam.

2. Description of the Prior Art

It is known, to obtain the cutting out of a substance by means of a laser beam, the laser beam is focussed, at the surface of the substance to be melted, due, more particularly to a frontal lens. It is also known that it is necessary to accompany that beam by a gas jet to drive out the liquified metal, as failing this, the fine groove cut out by the laser beam, closes up on itself in the majority of cases by collapse of its lateral faces.

It is also known that in the majority of cases, the frontal lens is constituted by a fragile substance and that it is protected by the gaseous jet flow.

It is known, moreover, that the implementing of a gas jet giving, with the substance, an exothermic reaction, enables without changing the nature of the phenomenon the accelerating of the speed and depth of cut of the beam.

SUMMARY OF THE INVENTION

The method and device which are the object of the present invention concern, more particularly, the implementing of means enabling the increasing of the cutting speed by imparting, to the gas jet, in an adjustable way, an extra energy, without modifying the laser beam.

More particularly, according to the invention, the method for cutting out by means of a laser focussed by a frontal lens and by means of a gas jet coming from a source having an adjustable pressure both crossing a nozzle is characterized in that it consists in imparting in an adjustable way to the gas jet coming into contact with the melted substance, great energy in all its forms, while ensuring the protection of the frontal lens.

The device implementing this method combines, therefore, adjusting means, means enabling high energy to be imparted in all its forms to the gas jet, as well as means for protecting the frontal lens of the laser each time the energy imparted to the gas upstream from the nozzle is liable to endanger that sensitive element.

The object of the invention is therefore a device for cutting out material by means of a laser beam and of a gas jet which is adaptable to a laser beam source, having a generally cylindrical shaped and provided with a central duct, characterised in that it comprises an adjusting valve for the input pressure of the gas brought previously to a predetermined temperature, a means for adjusting the injecting of the gas arranged below and at a certain distance from the frontal lens and in that the central duct ends in a converging-diverging nozzle whose converging portion has a substantially circular cross-section formed by two arcs of circles which are identical and symmetrical in relation to the axis of the nozzle and whose diverging part forms a truncated cone slightly inclined in relation to the axis.

It will easily be conceived that, for a predetermined pressure, the gas discharge will be more or less high according to the temperature of the gas jet. When the temperature of the injected gas remains lower than 100° C, the gas jet will generally leave at supersonic speeds if the gas pressure at the inlet of the duct reaches a value of a few bars.

When the gas is preheated at a higher temperature, twice that of the preceding temperature, for example, all things being equal, moreover, the supply of calories remains substantially the same by reason of the reduction of the corresponding mass discharge, so that the supply of kinetic energy remains preponderant.

Only when the temperature of the gas becomes clearly higher, the contact of the gas with the substance contributes actively to the preheating of the zone affected by the laser beam a few instants later, to make the melting thereof easier and to increases consequently, greatly greatly, the cutting speed.

This extra heating may also play an important part in the case where the chemical nature of the gaseous jet leads to an exothermic reaction with the substance to be cut with the laser beam. In that case, the reaction is primed more easily and the cutting speed is increased by as much.

BRIEF DESCRIPTION OF THE DRAWINGS

The invention is described in greater detail in the two examples herebelow with reference to the accompanying drawings in which.

DESCRIPTION OF THE PREFERRED EMBODIMENTS

Figure 1:
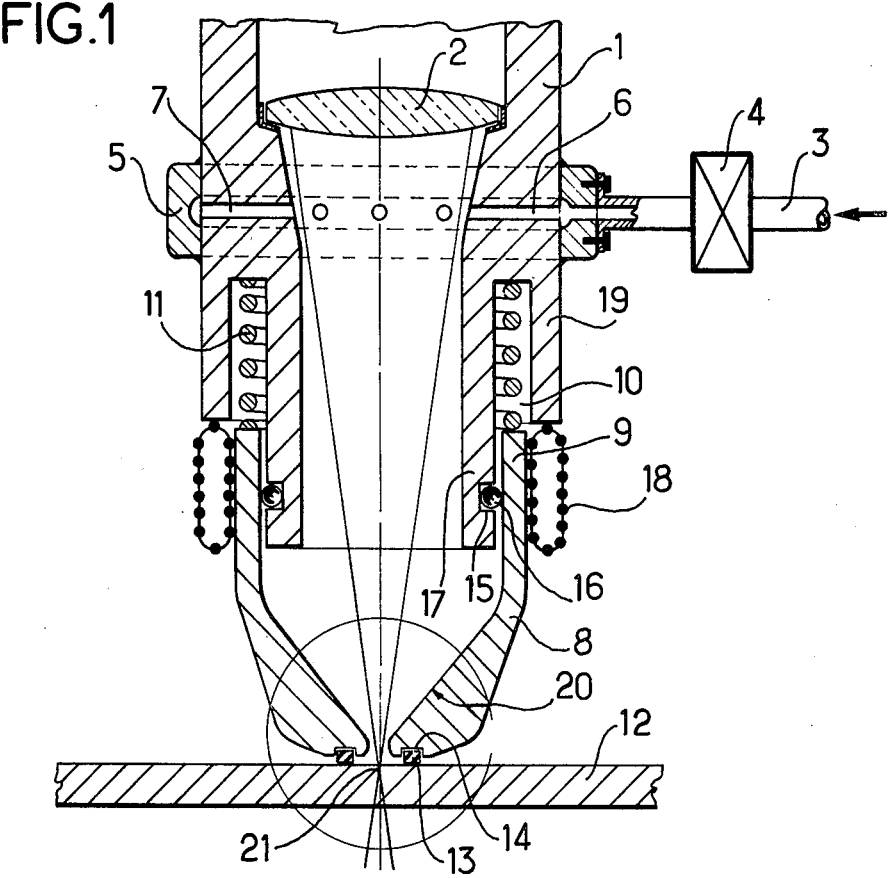
FIG. 1 shows diagrammatically, a cutaway view of a device implementing a first variant of the method.

FIG. 1 corresponds to a device in which the action of the speed and of the gas pressure remain preponderant.

The device according to the invention is connected to the laser beam generator device by a cylindrical sleeve 1 supporting the frontal lens 2 common with the laser beam generator device (not shown).

A gas intake 3 leads into a valve 4, which when operated, enables the flow and the pressure of the injected gas to be regulated. The gas leaving the valve is sent through an annular passage 5 formed with axial openings such as 6 and 7.

Figure 2:
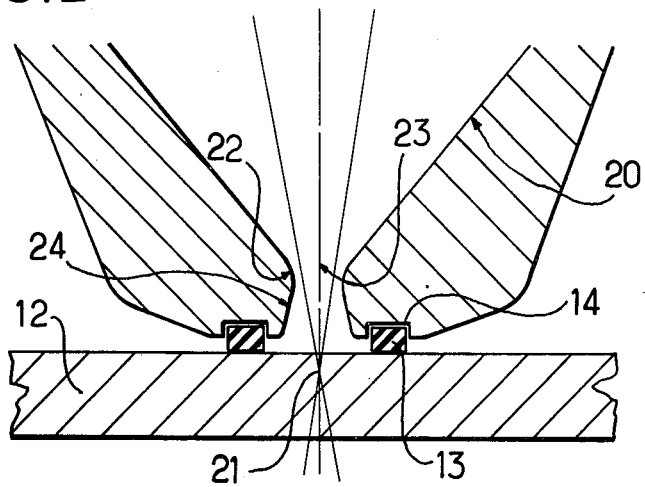
FIG. 2 shows a cutaway view of the gas outlet nozzle.

The cylindrical sleeve 1 is extended towards the base by a nozzle 8. A cylindrical portion 9 of that nozzle slides inside an annular opening 10 formed in the lower portion of the sleeve 1, a helical spring 11 housed in the annular opening 10 prevents the cylindrical portion 9 of the nozzle from sinking to the bottom of the annular opening 10. That spring applies the nozzle against the surface 12 to be cut out, through a sliding O ring 13 housed in the lower portion 14 of the nozzle. The cylindrical portion 9 slides without friction in the annular opening 10. It is pushed back outwards by a ring of balls housed in a slide rail formed in the central face 17 of the annular opening 10. Six slide rails with balls such as 18, are housed symmetrically in relation to the axis in the outside face 19 of the annular opening 10. In this way, the nozzle slides very freely and without friction at the surface of the part of be cut out. The cylindrical portion 9 of the nozzle is extended through a progressive fillet by a truncated cone shaped element. The lower end of the truncated cone-shaped element ends in an opening. That opening is cut into a converging-diverging nozzle. The truncated cone-shaped part ends, towards the bottom in a rounded portion 22 as is seen better in FIG. 2 showing an enlarged view of the base of the device. The outlet cross-section of that rounded portion is constituted by two portions of circle connected tangentially to the conical portion 20. Beyond the duct 23, that portion is extended by a cone element 24 diverging with the axis at an angle of less than 7°.

The return spring 11 keeps the base of the laser beam against the surface of the part to be cut out; the result of this is that the gas jet comes permanently in the same way with respect to the metal and that, for a determined adjustment of the pressure of the injected gas, the gas jet is always positioned in the same way in relation to the substance treated. The shape of the nozzle leads to a clearly supersonic flow at its outlet for a pressure of a few bars. The fluid thus enters the cutting out slot, slows very suddenly, conceeds a great part of its energy and discharges the melted substance by the completely cut out portion of the groove.

Experience shows that the cutting speed increases fairly rapidly when the gas outlet speed rises in the clearly supersonic region.

For a pressure of 5 bars, a speed in the order of a mach 1.7 has been measured at the outlet of the nozzle tube.

The temperature fo the injected gas is limited in numerous cases by the nature of the frontal lens 2. More particullarly, in the case of a beam formed by a light flux whose wavelength is in the order of 10 microns, it is obviously difficult to inject a gas at high temperature without ensure effective protection of the frontal lens.

That protection corresponds to the second variant of the method, which, in the majority of cases, combines with the variant described with reference to the drawings corresponding to FIGS. 1 and 2.

For a hot gas to act effectively on the substance to be cut out, it is an advantage for the gas to have, with respect to the temperature of the substance to be melted, the greatest difference in temperature possible and that it be brought into contact with the substance under high pressure. That condition leads to the use of a sliding seal ring. It is also necessary to implement a conductive gas. These conditions are generally not compatible with the substance of the frontal lens of the laser. That lens may indeed be melted by the gas used because of the high temperature. It may also be decomposed by the chemical action of the gas used. It is therefore necessary to ensure the protection of the frontal leans.

For the gas not to cool down on its path, it is necessary to inject it as near as possible to the injection nozzle.

Figure 3:
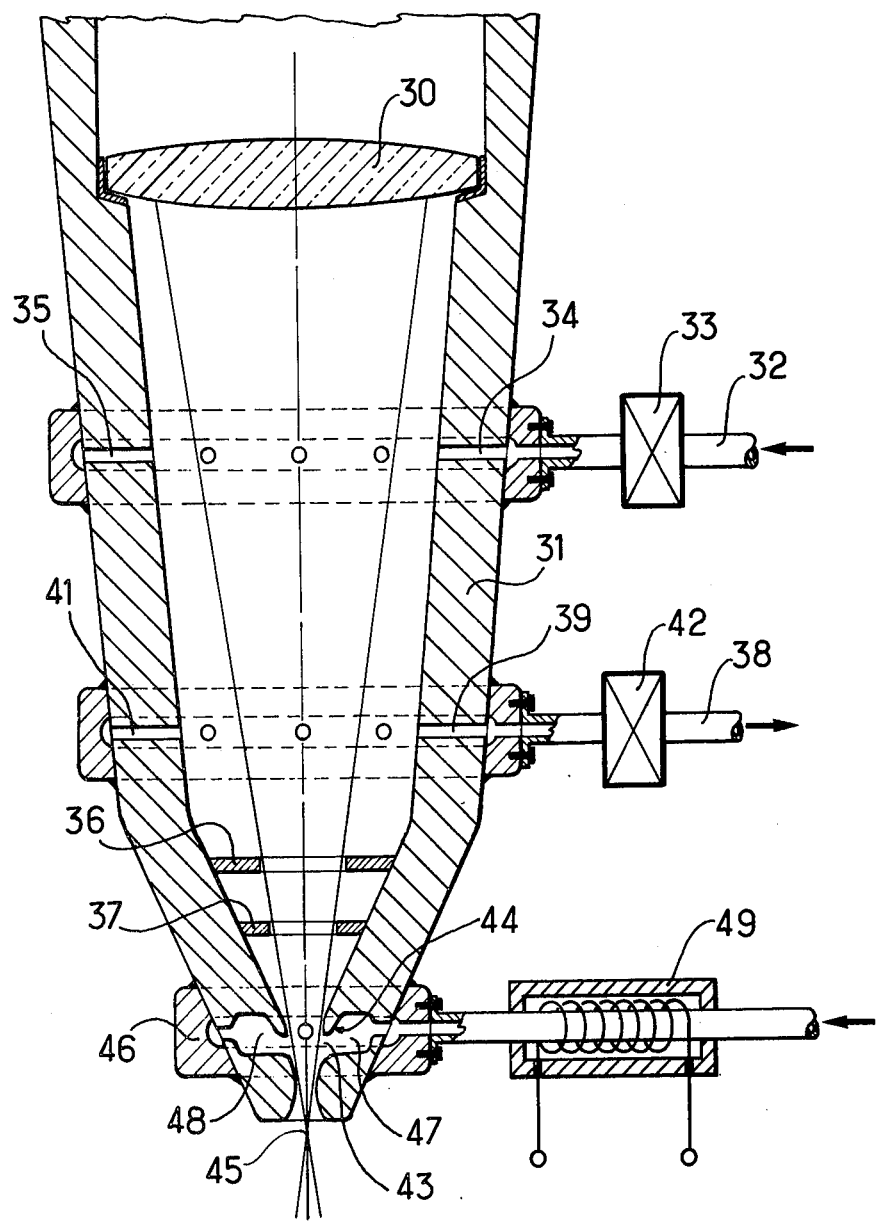
FIG. 3 shows diagrammatically a device implementing a second variant of the method.

FIG. 3 corresponds to a device meeting those multiple requirements.

The device adapted to the laser source whose frontal lens 30 has been shown comprises an outside body having approximately the shape of a cylinder 31 into which leads a passage 32 for a protective gas chosen from among insulating gases such as argon or, preferably, krypton. At the output of an adjusting valve 32, that gas is injected in the volume limited by the cylinder 31 from the bottom of the frontal lens 30 by to symmetrical openings such as 34 and 35 formed in the cylinder 31. Diaphragms such as 38 and 37 limit the flow of that gas towards the outlet nozzle. A discharge passage 38 connected to symmetrical openings 39 and 41 through a valve 42 enable the protective gas to be discharged. That assembly constitutes the protective system of the frontal lens 30.

The injection of the pre-heated gas is effected downstream from the last diaphragm 37 through a circular opening 43 having an upper lip 44 directing the gas towards the bottom and towards the center of the outlet That circular opening is put in communication with a circular ring 46 formed with symmetrical openings such as 47 and 48. An adjustable superheater 49 enables the temperature of the injected gas to be adjusted with a certain precision.

The outlet nozzle 45 has the same configuration as the nozzle describes with reference to FIG. 2.

The result of this is that when the gas is injected in the cutout groove at a sufficient pressure, the supersonic jet coming from the nozzle affects the liquified substance by means of the laser beam and continues to drive it out energetically.

Moreover, due to its pressure, the gas conceeds its calorific energy directly to the substance during cutting and accelerates very greatly the cutting speed, more particularly by overheating of the substance to be cut-out.

It was thus possible to prove that, by bringing the region of the groove traced in the substance where the spot of the laser is formed to a temperature of about 400° C, the cutting speed is doubled.

Moreover, the supply of an active gas brought to a high temperature contributes to giving rise to and maintaining an exothermic reaction with the substance to be cut-out which would not occur or would occur only with very great difficulty in usual cutting conditions with the supply of a reactive gas.

The cutting method according to the invention therefore makes it possible to obtain, in all cases, an increase in the speed or depth of cut as well as a cut edge whose chemical nature corresponds to the requirements of the user as a function of the machining or of the subsequent use anticipated.

In certain cases, it may be an advantage to reduce the speed of the gas through the outlet nozzle and to bring it down to infrasonic speeds more particularly be able to adjust the discharge thereof more easily. In that case, the supply of calorific energy continues to be preponderant and the properties listed above are observed in the device.

In other cases, it may be an advantage not to keep the gas at high pressure in contact with the method substance, the temperature of the injected gas making the use of a sliding seal ring haphazard. The nozzle of the device is then kept at a short distance from the substance to be cutout. The gas then draws its energy from its speed and its temperature.

Although the devices which have just been described may appear to afford the greatest advantages for implementing the invention in that particular technical situation, it will be understood that various modifications may be made thereto without going beyond the scope of the invention, being possible to replace certain of those elements by others capable of ensuring the same tecnical function therein, it may therefore appear to be an advantage, in certain particular circumstances, to reheat the injected gas, at a certain distance from the injection nozzle or to modify the protection means for the frontal lens.

I claim:

1. In a device for cutting a work piece comprising:
a cylindrical sleeve,
a laser beam source, including a frontal lens mounted within said sleeve for directing a laser beam axially through said sleeve,
a plurality of peripheral gas inlet openings within said sleeve downstream of said lens,
a source of gas under pressure coupled to said openings, the improvement comprising:
   valve means for adjusting the pressure of the gas entering said cylindrical sleeve interior through said gas inlet openings,
   said cylindrical sleeve terminating on the end facing said work piece and opposite said laser beam source in an axially slidable nozzle sealably carried by said cylindrical sleeve and means for spring biasing said sleeve towards extended position,
   a seal ring mounted on the end of said nozzle and contacting said work piece under said spring bias, said nozzle terminating adjacent said work piece interiorly of said seal ring in a convergent upstream portion and a divergent downstream portion for gas discharge at the outlet of the nozzle at supersonic speed confined by the seal ring contacting the work piece;
thereby, increasing the cutting speed of the laser beam cutting device.

2. In a device for cutting a work piece comprising:
a cylindrical sleeve,
a laser beam source including a frontal lens mounted within said sleeve for focussing the laser beam on said work piece,
a laser beam outlet nozzle mounted on said cylindrical sleeve downstream of said frontal lens, said outlet nozzle having a cylindrical portion at its upstream end adjacent said cylindrical sleeve and opening to a converging rectilinear section and terminating downstream in a divergent rectilinear section
a plurality of gas inlet openings within the periphery of said nozzle,
a source of gas under pressure coupled to said openings to effect gas discharge from the nozzle at high speed,
the improvement comprising:
   a superheater for appreciably increasing the temperature of the gas entering said nozzle through said peripheral gas inlet openings, and
   means intermediate of said gas inlet openings and said lens for protecting said frontal lens from the temperature of the heated gas entering said nozzle through said gas inlet openings for discharge through the nozzle outlet.

3. The cutting device as claimed in claim 2, wherein said frontal lens protecting means comprising means for circulating neutral gas within said cylindrical sleeve between said frontal lens and said gas inlet openings.

4. The cutting device as claimed in claim 3, wherein said frontal lens protecting means further comprises a plurality of diaphragms positioned within said nozzle intermediate of said neutral gas circulation means and said gas inlet openings for separating said circulating neutral protective gas from the gas at increased temperature entering said gas inlet openings for discharge through said nozzle.

* * * * *